United States Patent

Giles, Jr. et al.

[11] Patent Number: 5,516,579
[45] Date of Patent: May 14, 1996

[54] POLYAMIDE FIBER REINFORCED POLYETHERESTER COMPOSITION

[75] Inventors: Harold F. Giles, Jr., Shelby, N.C.; James R. Irish, Dalton, both of Mass.

[73] Assignee: General Electric Company, Pittsfield, Mass.

[21] Appl. No.: 650,984

[22] Filed: Feb. 4, 1991

Related U.S. Application Data

[63] Continuation of Ser. No. 459,908, Jan. 2, 1990, abandoned.

[51] Int. Cl.⁶ .................................................... B32B 7/00
[52] U.S. Cl. .......................... 428/272; 428/260; 428/290; 428/902
[58] Field of Search .................................. 428/267, 290, 428/902, 269, 272, 260

[56] References Cited

U.S. PATENT DOCUMENTS

| | | | |
|---|---|---|---|
| 3,274,159 | 9/1966 | Kluiber . | |
| 4,371,692 | 2/1983 | Wolfe, Jr. | 528/289 |
| 4,371,693 | 2/1983 | Wolfe, Jr. | 528/292 |
| 4,552,950 | 11/1985 | McCready | 528/292 |
| 4,556,688 | 12/1985 | McCready et al. | 525/33 |
| 4,562,232 | 12/1985 | Smith | 525/444.5 |
| 4,569,973 | 2/1986 | Tyrell et al. | 525/437 |
| 4,579,884 | 4/1986 | Liu | 525/216 |
| 4,711,933 | 12/1987 | McCready et al. | 525/415 |
| 4,735,999 | 4/1988 | Patterson et al. | 525/431 |
| 4,778,855 | 10/1988 | Boutni et al. | 525/146 |
| 5,014,357 | 5/1991 | Wiseman | 2/81 |

FOREIGN PATENT DOCUMENTS 0255845  12/1985  Japan ..................................... 525/425

*Primary Examiner*—James J. Bell

[57] ABSTRACT

A composition comprising a polyetherester resin reinforced with aromatic polyamide fibers, exhibits good adhesion between the polyetherester resin and the aromatic polyamide fibers and could be used in automotive or other high strength applications.

8 Claims, No Drawings

POLYAMIDE FIBER REINFORCED POLYETHERESTER COMPOSITION

This application is a continuation of Ser. No. 07/459,908, filed Jan. 2, 1990, now abandoned.

BACKGROUND OF THE INVENTION

1. Field of the Invention

The present invention relates to fiber reinforced compositions, and more particularly relates to compositions comprising a polyetherester resin reinforced with aromatic polyamide fibers.

2. Description of Related Art

High strength aromatic polyamide fibers are known in the art, and have been made into various forms including individual fibers, fiber bundles, mats and whiskers.

Thermoplastic polyetherester elastomers are also known in the art and have been used as molding compounds.

SUMMARY OF THE INVENTION

Applicant has discovered that compositions comprising aromatic polyamide fibers and polyetherester resin exhibit good adhesion between the polyamide fibers and the polyetherester resin. The compositions could be used in automotive or other high strength applications. The polyetherimide resin provides a matrix around the fibers thereby forming solid structures suitable for bumpers or body panels. The fibers give the structures high levels of tensile and impact strengths.

DETAILED DESCRIPTION OF THE INVENTION

The present invention involves compositions in the form of composites comprising thermoplastic polyetherester resin reinforced with high strength aromatic polyamide reinforcements.

Copolyetheresters are well known and have enjoyed continued and increasing commercial successes. They are available from several sources including the Hytrel® resins from E.I. dupont and the GAFLEX® resins from GAF Corporation and are described in U.S. Pat. Nos. 3,023,192; 3,651,014; 3,763,109; 3,766,146; 3,784,520; 3,801,547; 4,156,774; 4,264,761 and 4,355,155, among others, all incorporated herein by reference. It is desirable that the compositions be rigid at least to the extent that composites made therefrom are able to maintain their structural integrity and resist deformation upon low energy impact.

Suitable thermoplastic copolyetheresters (A) include both random and block copolymers. In general these are prepared by conventional esterification/polycondensation processes from (a) one or more diols, (b) one or more dicarboxylic acids, (c) one or more long chain ether glycols, and optionally, (d) one or more caprolactones or polycaprolactones.

Diols(a) which can be used in the preparation of the copolyetheresters include both saturated and unsaturated aliphatic cycloaliphatic dihydroxy compounds as well as aromatic dihydroxy compounds. These diols are preferably of a low molecular weight, i.e. having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methylpropanediol; 2,2-dimethyl propanediol; hexanediol; decanediol; 2-octyl undecanediol; 1,2-, 1,3- and 1,4-dihydroxy cyclohexane; 1,2-, 1,3- and 1,4- cyclohexane dimethanol; butenediol; hexenediol; etc. Especially preferred are 1,4-butanediol and mixtures thereof with hexanediol or butenediol.

Aromatic diols suitable for use in the preparation of the thermoplastic elastomers are generally those having from 6 to about 19 carbon atoms. Included among the aromatic dihydroxy compounds are resorcinol; hydroquinone; 1,5-dihydroxy naphthalene; 4,4'-dihydroxydiphenyl; bis(p-hydroxyphenyl)methane and 2,2-bis(p-hydroxy phenyl)propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, most preferably at least 80 mole %, based on the total diol content, be the same diol. As mentioned above, the preferred thermoplastic elastomers are those in which 1,4-butanediol is present in a predominant amount.

Dicarboxylic acids (b) which are suitable for use in the preparation of the copolyetheresters include aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethyl suberic acid, tetramethylsuccinic acid, cyclopentane dicarboxylic acid, decahydro- 1,5-naphthalene dicarboxylic acid, 4,4'-bicyclohexyl dicarboxylic acid, decahydro- 2,6- naphthalene dicarboxylic acid, 4,4-methylenebis(cyclohexane carboxylic acid), 3,4-furan dicarboxylic acid, and 1,1-cyclobutane dicarboxylic acid, Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxy-bis(benzoic acid), ethylene,2-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p($\alpha$-hydroxyethoxy)benzoic acid can also be used provided an aromatic dicarboxylic acid is also present.

Preferred dicarboxylic acids for the preparation of the polyetherimide esters are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed, it is preferred that at least about 60 mole %, preferably at least about 80 mole %, based on 100 mole % of dicarboxylic acid (b) be of the same dicarboxylic acid or ester derivative thereof. As mentioned above, the preferred copolyetheresters are those in which dimethylterephthalate is the predominant dicarboxylic acid.

Suitable long chain ether glycols (c) which can be used in the preparation of the thermoplastic elastomers are preferably poly(oxyalkylene)glycols and copoly(oxyalkylene)glycols of molecular weight of from about 400 to 1200. Preferred poly(oxyalkylene) units are derived from long chain ether glycol s of from about 900 to about 4000 molecular weight and having a carbon-to-oxygen ratio of from about 1.8 to about 4.3, exclusive of any side chains.

Representative of suitable poly(oxyalkylene)glycols there may be given poly(ethylene ether)glycol; poly(propylene ether)glycol; poly(tetramethylene ether)glycol; random or block copolymers of ethylene oxide and propylene oxide, including ethylene oxide and capped poly(propylene ether-)glycol and predominately poly(ethylene ether) backbone, copoly(propylene ether-ethylene ether)glycol; and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene) glycols are poly(propylene ether)glycol, poly(tetramethylene ether)glycol and predominately poly(ethylene ether) backbone copoly(propylene ether-ethylene ether)glycol.

Optionally, these copolyetheresters may have incorporated therein one or more caprolactones or polycaprolactones.

Caprolactones (d) suitable for use herein are widely available commercially, e.g., Union Carbide Corporation and Aldrich Chemicals. While epsilon caprolactone is especially preferred, it is also possible to use substituted caprolactones wherein the epsilon caprolactone is substituted by a lower alkyl group such as a methyl or ethyl group at the alpha, beta, gamma, delta or epsilon positions. Additionally, it is possible to use polycaprolactone, including homopolymers and copolymers thereof with one or more components, as well as hydroxy terminated polycaprolactone, as block units in the novel copolyetheresters of the present invention. Suitable polycaprolactones and processes for their production are described in, for example, U.S. Pat. Nos. 3,761,511; 3,767,627, and 3,806,495 herein incorporated by reference.

In general, suitable copolyetherester elastomers (A) are those in which the weight percent of (c) long chain ether glycol component or the combined weight percent of (c) long chain ether glycol component and (d) caprolactone component in the copolyetherester is from about 5 to about 70 weight percent. Preferred compositions are those wherein the weight percent of (c) or (c) and (d) is from about 10 to about 50 weight percent. Where both (c) long chain ether glycol and (d) caprolactone are present, each will comprise from about 2 to about 50 percent by weight, preferably from about 5 to about 30 percent by weight, of the copolyetherester.

As described above, the copolyetheresters may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference. Additionally, these compositions may be prepared by such processes and other known processes to effect random copolymers, block copolymers or hybrids thereof wherein both random and block units are present. For example, it is possible that any two or more of the foregoing monomers/reactants may be prereacted prior to polymerization of the final copolyetheresters. Alternatively, a two part synthesis may be employed wherein two different diols and/or dicarboxylic acids are each prereacted in separated reactors to form two low molecular weight prepolymers which are then combined with the long chain ether glycol to form the final tri-block copolyetherester. Further exemplification of various copolyetheresters will be set forth below in examples.

The thermoplastic polyetheresters are meant to also include polyetheresterimides which are known having been described in Wolfe, Jr., U.S. Pat. No. 4,371,692; Wolfe, Jr., U.S. Pat. No. 4,371,693; Kluiber, et. al., U.S. Pat. No. 3,274,159; McCready, U.S. Pat. No. 4,552,950 and Honore, et. al., "Synthesis and Study of Various Reactive oligomers and of Poly(ester-imide-ether)s, European Polymer journal, Vol. 16, pp. 909–916, Oct. 12, 1979, all of which are incorporated herein by reference.

These polyetheresterimide polymers can be prepared by reacting a diol, a long chain ether glycol and a diimide diacid which is the reaction product of an aromatic diamine and trimellitic anhydride.

Diols suitable for use in preparing the compositions of the present invention include saturated and unsaturated aliphatic and cycloaliphatic dihydroxy compounds as well as aromatic dihydroxy compounds. These diols are preferably of a low molecular weight, i.e. having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol decanediol; 1,2-, 1,3- and 1,4-cyclohexane dimethanol; butenediol; hexenediol, etc. Especially preferred are 1,4-butanediol and mixtures thereof with hexanediol or butenediol, most preferably 1,4-butanediol.

Aromatic diols suitable for use in the practice of the present invention are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis-(p-hydroxy phenyl)propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4-butanediol is present in a predominant amount, most preferably when 1,4-butanediol is the only diol.

Suitable long chain ether glycols are set out above. The diimide diacid is the reaction product of an aromatic diamine and trimellitic anhydride.

Suitable aromatic diamines include metaphenylene diamine, paraphenylenediamine, 1,6-naphthalenediamine, and the like.

While trimellitic an hydride is preferred as the tri carboxyl i c component, any of a number of suitable tricarboxylic acid constituents will occur to those skilled in the art including 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone-3,3',4 tricarboxylic anhydride, ethylene tricarboxylic anhydride; 1,2,5 naphthalene tricarboxylic anhydride; 1,2,4 butane tricarboxylic anhydride; diphenyl isopropylidene - 3,3',4 tricarboxylic anhydride; 3,4 dicarboxyphenyl 3-carboxylphenyl ether anhydride; 1,3,4 cyclohexane tricarboxylic anhydride; etc. These tricarboxylic acid materials can be characterized by the following formula:

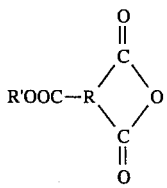

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzyl; most preferably hydrogen.

The amount by which each of the foregoing reactants is employed in the preparation of the novel polymers of the present invention is not, in general, critical and depends, in part, upon the desired properties of the resultant polymer. Obviously, sufficient amounts of diol versus diacid and tricarboxylic acid versus diamine must be present, as recognized in the art, to allow for substantially complete polymerization.

Polyetherimide esters can also be obtained by reacting one or more diols and one or more polyoxyalkylene diimide diacids.

Suitable diols are set forth above.

Polyoxyalkylene diimide diacids suitable for use herein are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group, which must be esterifiable and preferably is nonimidizable, with a high molecular weight polyoxylalkylene diamine.

In general, the polyoxyalkylene diimide diacids useful herein may be characterized by the following formula:

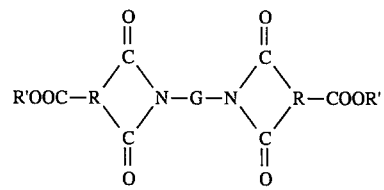

wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after the removal of the terminal (or as nearly terminal as possible) amino groups of a long chain alkylene ether diamine having an average molecular weight of from about 600 to about 12000, preferably from about 900 to about 4000, and a carbon-to-oxygen ratio of from about 1.8 to about 4.3.

Representative long chain ether glycols from which the polyoxyalkylene diamine is prepared by amination include poly(ethylene ether)glycol; poly(propylene ether)glycol: poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as ethylene oxide, propylene oxide, and methyl tetrahydrofuran. Polyformal glycols prepared by reacting formaldehyde with diols such as 1,4-butanediol and 1,5-pentanediol are also useful. Especially referred poly(alkylene ether)glycols are poly(tetramethylene ether)glycol, poly(propylene ether)glycol and poly(ethylene ether)glycols end capped with poly(propylene ether)glycol and/or propylene oxide.

In general, the polyoxyalkylene diamines useful within the scope of the present invention will have an average molecular weight of from about 600 to 12000, preferably from about 900 to about 4000.

The tricarboxylic component for making the polyoxyalkylene diimide diacid may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

While trimellitic anhydride is preferred as the tricarboxylic component for making the polyoxyalkylene diimide diacid, any of a number of suitable tricarboxylic acid constituents will occur to those skilled in the art including 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone-3,3',4 tricarboxylic anhydride, ethylene tricarboxylic anhydride; 1,2,5 naphthalene tricarboxylic anhydride; 1,2,4 butane tricarboxylic anhydride; diphenyl isopropylidene 3,3',4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

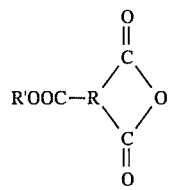

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzy; most preferably hydrogen.

Briefly, these polyoxyalkylene diimide diacids may be prepared by known imidization reactions including melt synthesis or by synthesizing in a solvent system. For example, the diimide diacid may be prepared by reacting 2 moles of the tricarboxylic component per mole of polyoxyalkylene diamine by refluxing at between about 100° C. to 300° C., preferably 150° C. to 250° C., in a suitable solvent such as dimethyl formamide, diethyl formamide, diethyl acetamide, N-methyl caprolactam, or dimethylsulfoxide, among others known to those skilled in the art, or in an azeotropic mixture of said solvent with an additional inert solvent, e.g. xylene. The solvent is subsequently removed by distillation and the residual solvent removed by vacuum drying to leave the diimide diacid. Alternatively the diimide diacid may be prepared by melt synthesis wherein the tricarboxylic component and the diamine are heated at between 100° C. to 300° C., preferably 150° C. to 250° C., while drawing off water, for several hours to produce the diacid. Finally, if the diimide diester is to be used, these may conveniently be prepared by heating about 2 moles of the tricarboxylic component per mole of diamine in an excess of the low molecular weight diol to be used in the polymer ultimately desired. The reaction mixture should contain an esterification catalyst, such as a titanate ester. The reaction is completed by boiling while slowly removing distillate to insure that esterification is completed. Preparation of the diimide diacid or their esters is not meant to be limited to the procedure just described which are illustrative of synthetic methods known in the art.

The polyetherimide ester polymers can be prepared readily by melt condensation procedures. Typically, the procedure involves the reaction in the presence of a titanate catalyst of a polyoxyalkylene diimide diacid or an ester thereof with a low molecular weight diol, the latter being present in a molar excess. Initially, reaction takes place at about atmospheric pressure while the temperature is increased up to about 240° C. to 300° C. while distilling off volatiles. The resulting prepolymer of relatively low molecular weight can be converted to a high molecular weight polymer by continuing the reaction at 240° C. to 300° C. at reduced pressures, preferably less than 670 Pa and more preferably at less than 250 Pa.

The typical procedure for the preparation of the polyetherimide ester polymers can be varied widely. For example, as an alternative to the foregoing procedure, it is also possible to directly charge the reactor system with the polyoxyalkylene diimide diacid reactants rather than preform the diimide diacid.

Specifically, when preparing the polyetherimide esters by the procedure in which the diimide diacid or ester thereof is formed during the course of the melt condensation, the tricarboxylic component and the polyoxyalkylene diamine are charged in place of the preformed diimide diacid or its ester along with the other ingredients. From then on, the melt condensation is conducted in substantially the same manner as previously described. In theory, two moles of tricarboxylic component react with one mole of diamine; however, when the diimide diacid is prepared in the presence of the low molecular weight diol, a minor amount of tricarboxylic component may react with available hydroxyl groups and ultimately function as a branching agent in the finished polymer. Within limits, the degree of branching in the finished polymer can be controlled by varying the mole ratio of tricarboxylic component to diamine. An excess of diamine reduces the degree of branching, while an excess of the tricarboxylic component increases branching. Ratios of 2 moles of tricarboxylic component to 0.85 to 1.15 moles of diamine have been found to yield useful polymers. In addition to controlling branching by varying the tricarboxylic component/diamine mole ratio, one can compensate for branching by introducing a monofunctional reactant such as benzoic acid in minor amounts.

With reference to branching, it should be noted that polyetherimide esters, when prepared from preformed diimide diesters, are substantially free of branching. If branching is desired, one needs only to introduce a branching agent, such as trimellitic anhydride, along with the preformed diimide diester. The amount of branching agent generally will be less than 0.15 moles per mole of diimide diacid or ester thereof. Useful branching agents other than trimellitic anhydride include trimethyl trimellitate, glycerol, trimethyl propane, trimesic acid and its esters and the like.

In general, the polyetherimide esters described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547; herein incorporated by reference.

It is customary and preferred to utilize a catalyst in the process for the production of the polyetherimide esters. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,075,952 among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, calcium acetate, manganese acetate or antimony trioxide, and/or with a catalyst quencher as described above. The catalyst should be present in amounts of from about 0.005 to 2.0 percent by weight based on the total reactants.

Both batch and continuous methods can be used for any stage of polymer preparation. Further polymerization of lower molecular weight polymers can also be accomplished in the solid phase by heating solid polymer particles in a vacuum or in a stream of inert gas to remove liberated low molecular weight diol.

The preparation of the polyetherimide esters can be carried out in the presence of an antioxidant. As well as other stabilizers including thermal and UV stabilizers. While stabilizers are not normally required on a laboratory scale, their use, particularly oxidative and/or thermal stabilizers, is preferred on a commercial scale.

Most any stabilizer known in the art for polyetherimide esters may be used including phenols and their derivatives, amines and their derivatives, compounds containing both hydroxyl and amine groups, hydroxyazines, oximes, polymeric phenolic esters and salts of multivalent metals in which the metal is in its lower valence state.

The polyetheresters may be blended with, for example, from 1% to 50% by weight of a second thermoplastic polymer. For example, polybutylene terephthalate resin may be employed at a level of 35% by weight based on the total combined weight of polyetherester and polybutylene terephthalate.

The aromatic polyamide materials useful in this application are generally derived from an aromatic diacid such as terephthalic acid, isophthalic acid, phthalic acid, naphthalene diacid, and the like and aromatic diamines such as metaphenylenediamine, paraphenylenediamine, 1,6-naphthalenediamine, and the like. Aromatic amide polymers which are useful in this invention are prepared and sold commercially by DuPont under the trademark KEVLAR® resin and NOMEX® resin. KEVLAR® is the monomeric repeating units of terephthalic acid and 1,4-phenylenediamine. The form of the aromatic amide polymer should be any form which reinforces the polyetherester resins. These forms include fibers, mats, whiskers, and any other form which is capable of reinforcing the polyetherester resins.

The quantity of the reinforcing aromatic amide polymer is any quantity which effectively reinforces polyetherester resins. Generally, from about 0.5% to about 85 weight % of the reinforcing material, based upon the polyetherester resins present plus the aromatic amide polymer in the composition can be employed. Preferably from about 10 to about 65 weight % of the reinforcing material can be employed. The reinforcing material can be incorporated into the composition in any of the known methods. The fibers can be added to powdered polycarbonate polydiorganosiloxane random block copolymer, mixed and then extruded together. The reinforcing material can be in mat form and the polyetherester resins added so as to make a sandwich of the mat. The mat can be present in a mold and the molten polyetherester resins can be added thereto.

The compositions are preferably in the form of a composite made by melt laminating one or more layers of polyetherester film and one or more layers of aromatic polyamide aramide fibers.

Applicant has discovered that polyetherester resin exhibits excellent adhesion to the aromatic polyamide aramid fibers.

Suitable composite structures have layers of plain weave KEVLAR® aromatic polyamide aramid fibers (APA) fabric and layers of polyetherester (PEE) film. Suitable structures can be obtained by melt laminating at 370° F. a layup of the following layers APA fiber weave/PEE film/APA fiber weave/APA fiber weave/APA fiber weave/PEE film/APA fiber weave/APA fiber weave/PEE film/APA fiber weave.

EXAMPLES

The following examples illustrate the present invention but are not meant to limit the scope thereof.

| | | EXAMPLES | | | |
|---|---|---|---|---|---|
| Example | Layup | Pressure | Temperature | Time | Adhesion |
| 1 | A/B/A | 2000 psi | 320° F. | 3 min | Good |
| 2 | A/B/A/A/B/A | 3000 psi | 370° F. | 5 min | Good |
| 3 | A/B/A/A/A/B/A | 3000 psi | 370° F. | 3 min | Good |
| 4 | A/A/A/B/A/A/A | 3000 psi | 370° F. | 3 min | Spotty Flow |
| 5 | A/B/A/A/B/A | 3000 psi | 365° F. | 3 min | — |
| | Then | 3000 psi | 382° F. | 6 min | — |
| | Then | 10000 psi | Cooling | — | Not Complete Adhesion at Center |
| 6 | A/B/A/A/B/A | 10000 psi | 365° F. | 3 min | — |
| | | | 382° F. | 6 min | Good |

A = KEVLAR ® aromatic polyamide aramid fiber weave, a poly(p-phenylene terephthalamide) which is the condensation product of terephthaloyl chloride and p-phenylene diamine.
B = polyetherester is a random copolyetherester derived from the reaction products of 25 parts butanediol, 48 parts dimethyl terephthalate, 14 parts hexanediol and 13 parts poly(tetra methylene ether)glycol.

What is claimed:

1. A rigid composite structure, comprising:

aromatic polyamide fibers in a thermoplastic matrix, said matrix comprising a polyetherester resin, wherein the fibers are present in an amount effective to reinforce the matrix and provide a rigid composite structure having increased tensile strength and increased impact strength relative to an analogous structure formed from the polyetherester resin alone.

2. The structure of claim 1 wherein said aromatic polyamide fibers are the condensation product of terephthaloyl chloride and para-phenylene diamine.

3. The structure of claim 1 wherein said polyamide fiber is present at a level of 0.5 percent to 85 percent by weight based on the total weight of polyamide fiber and polyetherester resin, said polyetherester resin being present at a level of from 99.5 percent to 15 percent by weight based on the total weight of polyamide fiber and polyetherester resin.

4. The structure of claim 1, wherein the structure consists essentially of:

aromatic polyamide fibers in a polyetherester resin matrix.

5. The structure of claim 1 wherein said fibers are present in the form of a woven fiber layer.

6. The structure of claim 1 wherein said thermoplastic matrix further comprises a polybutylene terephthalate resin.

7. The structure of claim 1, wherein the structure is an automotive part.

8. The structure of claim 1, wherein the composite structure is made by melt laminating one or more layers of polyetherester film and one or more layers of aromatic polyamide fibers.

* * * * *